2,961,706

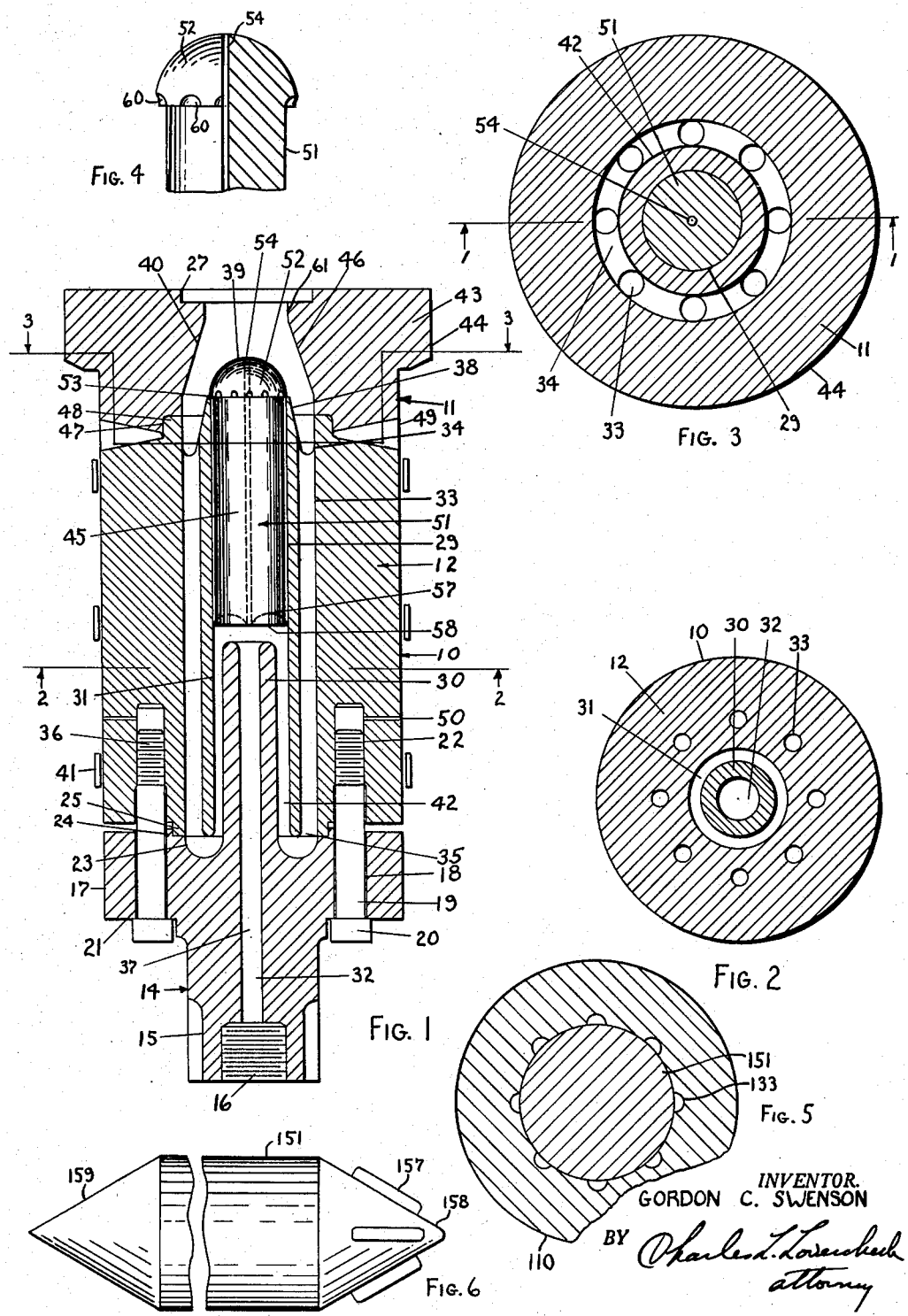
Nov. 29, 1960 — G. C. SWENSON — 2,961,706
BLEED BACK WITH LOOSE MANDREL FOR AN INJECTION MOLDING MACHINE
Filed Aug. 20, 1958
INVENTOR.
GORDON C. SWENSON United States Patent Office 2,961,706
Patented Nov. 29, 1960

BLEED BACK WITH LOOSE MANDREL FOR AN INJECTION MOLDING MACHINE

Gordon C. Swenson, 310 Arbuckle Road, Erie, Pa.

Filed Aug. 20, 1958, Ser. No. 756,252

8 Claims. (Cl. 18—30)

This invention relates to heating cylinders and, more particularly, to heating cylinders for use on an injection molding machine.

This application is a continuation in part of patent application, Serial No. 733,526, filed May 7, 1958.

The patent application referred to above discloses a reverse flow heating cylinder. The present invention disclosed herein provides an improvement in the reverse flow heating cylinder by providing a means for ventilation of the hot gases from the molten plastic by way of a bypass to return the hot gases along with relatively small portions of hot plastic into the inlet in the voids between the cold incoming granular plastic material. This inventilation is accomplished by providing a bypass passage from the inlet to the second reverse flow passage.

The voids or air spaces between the granules in the ordinary cylinder are excellent heat insulators. Therefore, the ordinary heating process of the plastic material is inherently inefficient since it is difficult to drive heat across the voids from one granule to another. In the present disclosure, the hot plastic bypassed back into the incoming granular material fills the voids between the granules and "wets" the surface of the plastic granules, partially melting them and thus bringing the resulting plasticized mass into heat conducting relation with the walls of the passages through the cylinder. The result is that heating is done by heat conduction through a well recognized efficient "liquid immersion" process as contrasted to the usual inefficient transfer of heat from the internal walls of the cylinder from one granule to another. Thus, the heat transferred from the hot plastic material to the incoming granules pre-softens the material prior to the next "shot." As the hot plastic from the bleed back holes strikes the cold granules, it cools and jells and thus is trapped while trapped air and gas escape. Thus, in the cylinder disclosed herein, the material will be pre-softened when it enters the spreader holes instead of being in cold granular form. This results in lower pressures and faster injection.

The return of hot plastic through the various by-pass openings also tends to displace air which is ordinarily trapped between and within the granules and carried into the average cylinder. It follows that the resulting molded parts will be more strain free because the gas and entrapped air are vented from the molten plastic material prior to injection.

Tests have shown that entrapped air and gases in molded plastic articles cause weak parts. This air is in the form of bubbles when the plastic is not under pressure. When the plastic is under pressure, the air becomes dissolved in the plastic material and sometimes burns, causing brown streaks, laminations, and welds in the material and, consequently, in the molded article. When viewed under polarizing light, these gas type welds and laminations can be distinguished from other strains caused by spreader legs, pins, or flutes or by laminar flow of plastic material through the conventional heating cylinder.

More specifically, it is an object of this invention to provide a heating cylinder for an injection molding machine which is simple in construction, economical to manufacture, and simple and efficient in use.

Another object of the invention is to provide a heating cylinder for an injection molding machine which provides mixing and melting efficiencies heretofore only obtainable with costly preplasticizing devices, in combination with a gas or trapped air bypass or bleed back.

Still another object of the invention is to provide a heating cylinder of the reverse flow type wherein a bypass path is provided between a reverse flow passage and an inlet whereby hot plastic material can be returned from the reverse flow passage to the inlet with a view to utilizing the latent heat in the hot plastic when interspersed among cold incoming granules.

A further object of the invention is to provide a bypass passage in a reverse flow heating cylinder wherein a floating spreader tip has a clearance space between it and the spreader bore walls to allow the air and hot plastic to return to the inlet.

A still further object of this invention is to provide a floating spreader having an opening theerthrough in a reverse flow heating cylinder for gas removal and heat introduction into the cold incoming granular material.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention in order to adapt the invention to all of the different makes and models of injection machines on which the cylinder may be used.

In the drawing:

Fig. 1 is a view of a heating cylinder according to the invention taken on line 1—1 of Fig. 3;

Fig. 2 is a cross sectional view taken on line 2—2 of Fig. 1;

Fig. 3 is a view taken on line 3—3 of Fig. 1;

Fig. 4 is a partial cross sectional view of a removable spreader tip;

Fig. 5 is a cross sectional view of another embodiment of the invention; and

Fig. 6 is a view of a spreader used in the embodiment of the invention shown in Fig. 5.

Now with more specific reference to the drawing, Figs. 1 to 4 inclusive show a heating cylinder 10 for use in an injection molding machine for plastic. The cylinder 10 has a clamping or conventional flange section 11, a spreader section 12, and a nozzle section 14.

The nozzle section 14 has a reduced size end 15 terminating in a threaded bore 16 for attaching to a suitable connecting nozzle to feed a plastic molding die. The reduced size end 15 is integrally connected to an enlarged end 17 which is, in effect, a flange extending outwardly from the reduced size end 15. Spaced bores 18 receive studs 19 having heads 20. The enlarged end 17 has a flat shoulder surface 21 which is engaged by the stud heads 20. The studs 19 threadably engage threaded holes 22 threaded at 36 in the spreader section 12. An alternate method of fastening the nozzle section 14 to the spreader section 12 may be by means of welding as taught in Patent No. 2,766,483.

An annular groove 23 is formed in the end of the nozzle section 14 adjacent the spreader section 12. Outwardly of the annular groove 23 is formed an annular bore 24 which receives an annular end portion 25 of the spreader section 12 and overlies the end portion 25 and, acting as a register, it holds it against outward movement.

The nozzle section 14 has a tubular inner member 30 integrally attached thereto and forming the inner wall of the annular groove 23. The tubular member 30 extends into a bore 31 in the spreader section 12 and the tube 37 through the tubular member 30 forms a continuation of a bore 32 in the outer end of the nozzle section 14. The bore 31 in the tubular member 30 and the bore 32 form a storage tube 37.

The spreader section 12 is a cylindrical section having spaced bores 33 extending therethrough and terminating in the upper end at 34 and at the lower end at 35. The spaced bores 33 form a first passage through the cylinder. The central bore receives the tubular inner member 30 as aforesaid. An end 58 of a floating spreader 51 forms a blind end of the bore 31 and may be formed as shown with a central conical raised portion 38 which forms a directing baffle for directing the plastic material into the storage tube 37.

The floating spreader 51 is supported in the upper end of a bore 29. The tubular member 30 is shorter than in the reverse flow cylinder disclosed in the prior case. A bore 42 extends completely through the spreader section 12 and the floating spreader 51 is inserted therein. The spreader 51 has a cylindrical portion 45 disposed in the bore in the storage tube 37. The cylindrical portion 45 is approximately .025 inch smaller than the bore in which it is received so that a clearance for the escape of gases as well as a bypass passage is provided.

The spreader 51 has a head 52 which presents a shoulder 53 which overlies the end of the conical raised portion 38 of the spreader section 12. The head 52 has a hemispherical end portion 39 facing toward the inlet and forming a spreader for the incoming plastic. A hole 54 is formed in the floating spreader 51 to act as an alternate second bypass for gas and hot plastic. An annular groove 57 in the end of the spreader 51 defines a top 58 and acts as a baffle for directing plastic from the bore 42 to the storage tube 37. Spaced radially extending grooves 60 are formed in the downwardly facing shoulder 53 of the head 52. The grooves 60 are proportional to the number of bores 33. The outside diameter of the head 52 is approximately .010 inch smaller than the diameter of an inlet opening 61 so that the spreader 51 may be easily removed.

The clamping section 11 has a body portion 43 with a flange 44 outwardly extending therefrom and integrally attached thereto. The flange 44 provides a means for attaching the cylinder 10 to an injection molding machine at a counterbore 27. The clamping section 11 has a tapered bore 46 having tapered walls 40 which form an inlet to the bores 33 which form a first passage. The bore 31 forms a second flow passage between the bore 31 and the bore 32 in the tubular member 30 extending from the portion 38 to the groove 23. The storage tube 37 forms a third passage.

The lower end of the clamping section 11 is counterbored at 47 to receive an upwardly extending rim 48 of the spreader section 12. A groove is machined between the clamping section 11 and the nozzle section 14 to receive welding material 49 to hold the cylinder 10 in rigid assembled relation. The overlying shoulders formed by the edges of the counterbore 47 hold the clamping section 11 and the spreader section 12 together so that there is no relative movement during thermal expansion. Heat is provided by conventional heating bands 41.

Holes 50 are formed in the side walls of the spreader section 12. The holes 50 connect the threaded holes 22 with the outside of the cylinder 10 to allow gases which enter the threaded bores from the inside of the cylinder 10 to escape.

An alternate design of spreader is shown in Figs. 5 and 6 wherein a spreader section 110 may be attached between a nozzle section and a clamping section like the sections 14 and 11 shown in Fig. 1.

Holes 133 are bored through the spreader section 110. Then the center is bored out to the center thereof, leaving a bore to receive a floating spreader 151, the holes 133 forming peripherally spaced grooves. The spreader 151 is generally cylindrical and fits loosely into the central bore for easy removal and has fins 157 circumferentially spaced on its conical outlet end 158. The spreader 151 has a conical inlet end 159. Thus, the spreader 151 may be removed for easy cleaning and repair.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A heating cylinder for plastic comprising a hollow body having an inlet and an outlet, a spreader in said body, said spreader being disposed generally concentric to said hollow in said body and spaced therefrom defining a first flow passage therebetween communicating with said inlet, an annular area in said spreader concentric with said first flow passage and communicating therewith and defining a second flow passage connected to said first flow passage, a storage tube formed in said spreader concentric with said second flow passage and communicating with said outlet to said cylinder, means connecting said storage tube to said inlet, said means connecting said storage tube to said inlet comprising a mandrel fitted loosely into said annular area in said spreader, and bores through said mandrel communicating between said storage tube and said inlet.

2. The cylinder recited in claim 1 wherein said inlet has a substantial capacity sufficient to provide a preheated quantity of plastic equal to one complete shot on the machine adapted to use said cylinder.

3. A heating cylinder for injection molding comprising a hollow body having a first, a second, and a third flow passage therethrough, said first flow passage communicating with an inlet at one end and with said second flow passage at the other end, said second flow passage being connected with said third flow passage at the end thereof opposite to said end connected to said first flow passage, said third flow passage being connected to an outlet, said flow passages being arranged so that the flow therethrough in said second flow passage is in a direction one hundred eighty degrees to the flow through said first flow passage and the flow in said third flow passage is in the same direction as in said first flow passage, said flow passages being disposed concentric to each other, heating means disposed around said hollow body, a mandrel fitted loosely in an opening between said first passage and said second flow passage, and a relatively small sized passage between said mandrel and the walls of said opening.

4. A heating cylinder for use in the injection molding of plastic material comprising a hollow body having an inlet adapted to be connected to a source of relatively cold plastic material, an outlet adapted to be connected to a die means, a spreader disposed in said hollow body and defining the inside surface of a first annular passage, said spreader having a conical point extending toward said inlet, a second passage disposed inside said spreader and generally concentric to said first passage and connected thereto so that plastic material flows therein in a direction one hundred eighty degrees to the flow through said first passage, a third passage connected to said second passage and concentric thereto and connecting said second passage to said inlet, an opening through said conical point connecting said first passage and said second passage, a mandrel fitted into said opening and movable relatively therein, means connecting a part of said second passage to said inlet whereby hot plastic material from said second passage may mix with plastic material at said inlet, and heating means for said cylinder.

5. A heating cylinder for plastic comprising a hollow body having an inlet and an outlet, a spreader in said body, said spreader being disposed generally concentric to said hollow in said body and spaced therefrom defining a first flow passage therebetween communicating with said inlet, an annular area in said spreader concentric with said first flow passage and communicating therewith and defining a second flow passage connected to said first flow passage, a storage tube formed in said spreader concentric with said second flow passage and communicating with said outlet to said cylinder, and means connecting said storage tube to said inlet, said means connecting said storage tube to said inlet comprising a bore in said spreader communicating between said inlet and said storage tube and a headed member loosely fitted into said bore with its head overlying said spreader adjacent said bore.

6. A heating cylinder comprising a generally cylindrical spreader section having a conical member extending from one end thereof and a central bore extending axially therethrough, a groove in one end of said spreader section concentric with said conical member, radially spaced bores through said spreader section communicating with said concentric groove and the opposite end of said spreader section and defining a first flow passage, an axially extending flange on each end of said spreader section, a nozzle section, a bored tubular member on said nozzle section extending into said central bore in said spreader section and defining a second flow passage through said spreader section, a bore in said nozzle section connecting said bore through said tubular member with the outside of said nozzle section, means to connect said nozzle section to a die, a flange section, an inlet in said flange section receiving said conical member, a counterbore in said flange section receiving one said axially extending flange, and bypass means connecting said second passage with said inlet, said bypass means comprising an elongated member disposed in said central bore with a clearance between said elongated member and said central bore.

7. The cylinder recited in claim 6 wherein bypass openings are formed in said elongated member between said second passage and said inlet.

8. A heating cylinder comprising a flange section and a nozzle section with a spreader section therebetween, said sections each having an outside dimension equal to the other and being connected together, an inlet passage through said flange section, a central bore in said spreader section, a tube having a bore therethrough on said nozzle section, said tube on said nozzle section defining a flow passage between it and the wall of said central bore in said spreader section, spaced bores in said spreader section connecting between the end of said central bore in said spreader section remote from said nozzle section to said inlet passage, said bore through said tube connecting the end of said spreader section bore remote from said nozzle section to the outlet from said nozzle section, means closing the end of said bore in said nozzle section adjacent said inlet passage, a relatively small bypass passage connecting said central bore in said spreader section with said inlet passage whereby gases and hot plastic material may flow from said bore in said tube to said inlet passage, said means closing said bore in said nozzle section comprising a floating spreader member having a portion interfitting with said central bore, and a head overlying the end of said spreader member.

References Cited in the file of this patent
UNITED STATES PATENTS

| | | |
|---|---|---|
| 2,405,039 | Jesionowski | July 30, 1946 |
| 2,669,750 | Keeney | Feb. 23, 1954 |
| 2,737,686 | Harkenrider | Mar. 13, 1956 |
| 2,766,483 | Stokes | Oct. 16, 1956 |
| 2,831,214 | Eyles et al. | Apr. 22, 1958 |
| 2,871,516 | Sherman et al. | Feb. 3, 1959 |

FOREIGN PATENTS

| | | |
|---|---|---|
| 1,013,865 | Germany | Aug. 14, 1957 |